United States Patent
Kapoor et al.

(10) Patent No.: US 8,917,673 B2
(45) Date of Patent: Dec. 23, 2014

(54) CONFIGURABLE DOWNLINK AND UPLINK CHANNELS FOR IMPROVING TRANSMISSION OF DATA BY SWITCHING DUPLEX NOMINAL FREQUENCY SPACING ACCORDING TO CONDITIONS

(75) Inventors: Samir Kapoor, Doylestown, PA (US); Junyi Li, Bedminster, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1485 days.

(21) Appl. No.: 11/487,050

(22) Filed: Jul. 14, 2006

(65) Prior Publication Data
US 2008/0013480 A1  Jan. 17, 2008

(51) Int. Cl.
*H04W 4/00* (2009.01)
*H04W 36/06* (2009.01)

(52) U.S. Cl.
CPC .................................... *H04W 36/06* (2013.01)
USPC ........... 370/329; 370/328; 370/331; 370/332; 370/469; 455/420; 455/421; 455/435.2; 455/509

(58) Field of Classification Search
CPC ..... H04W 36/06; H04W 36/08; H04W 36/18; H04W 36/11; H04W 36/0016; H04W 36/0027; H04W 36/32; H04W 36/30; H04W 60/06; H04W 60/005
USPC ........ 455/432.1–453, 455, 509, 516, 522, 63, 455/67.3; 370/237, 322, 329, 348, 370/294–295, 276, 277, 296, 478, 319, 321, 370/344, 347
See application file for complete search history.

(56) References Cited

U.S. PATENT DOCUMENTS 5,424,727 A    6/1995  Shieh
5,917,812 A *  6/1999  Antonio et al. ............... 370/337

(Continued)

FOREIGN PATENT DOCUMENTS

EP    0873034 A2    10/1998
EP    1341318 A2    9/2003

(Continued)

OTHER PUBLICATIONS

International Search Report and Written Opinion—PCT/US2007/073400, International Search Authority—European Patent Office—Mar. 31, 2008.

(Continued)

*Primary Examiner* — Babar Sarwar
(74) *Attorney, Agent, or Firm* — Donald D. Min

(57) ABSTRACT

Transmission techniques using configurable channels for the downlink and/or uplink are described. In one aspect, the downlink channel and/or uplink channel may be independently selected for a terminal. The terminal may establish a connection with a base station on default downlink and uplink channels. Another downlink channel and/or another uplink channel may be selected based on various factors such as channel quality, loading, and interference. The terminal would then switch to the new downlink and/or uplink channel for communication. In another aspect, the base stations broadcast sector information used by the terminals for communication and/or channel selection. The sector information may include various types of information such as the available downlink and uplink channels, the frequencies of the available channels, the loading on the available channels, and QoS information. The terminals may select a sector, a downlink channel, and/or an uplink channel based on the sector information.

68 Claims, 7 Drawing Sheets

(56) References Cited

U.S. PATENT DOCUMENTS

| | | |
|---|---|---|
| 6,154,655 A | 11/2000 | Borst et al. |
| 6,381,460 B1 | 4/2002 | Klein et al. |
| 6,594,238 B1* | 7/2003 | Wallentin et al. ............ 370/252 |
| 6,681,112 B1* | 1/2004 | Schwarz et al. ............. 455/436 |
| 7,020,471 B2* | 3/2006 | Bing et al. ................... 455/447 |
| 7,047,009 B2 | 5/2006 | Laroia et al. |
| 7,502,596 B2* | 3/2009 | Takao et al. ..................... 455/78 |
| 8,068,841 B2 | 11/2011 | Laroia et al. |
| 2001/0055297 A1 | 12/2001 | Benveniste |
| 2002/0012332 A1* | 1/2002 | Tiedemann et al. ......... 370/335 |
| 2002/0102941 A1* | 8/2002 | Kuiri et al. ...................... 455/63 |
| 2002/0145988 A1* | 10/2002 | Dahlman et al. ............. 370/335 |
| 2003/0232622 A1* | 12/2003 | Seo et al. ...................... 455/437 |
| 2004/0266448 A1 | 12/2004 | Kato et al. |
| 2005/0032537 A1 | 2/2005 | Miyashita |
| 2005/0111407 A1* | 5/2005 | Hosein et al. ................ 370/329 |
| 2005/0141450 A1* | 6/2005 | Carlton et al. ............... 370/329 |
| 2005/0250506 A1* | 11/2005 | Beale et al. ................ 455/452.1 |
| 2006/0183482 A1* | 8/2006 | Ueda ............................ 455/439 |
| 2007/0110000 A1* | 5/2007 | Abedi .......................... 370/332 |

FOREIGN PATENT DOCUMENTS

| | | |
|---|---|---|
| GB | 2320991 | 7/1998 |
| GB | 2384139 | 7/2003 |
| JP | H04321330 A | 11/1992 |
| JP | 10028282 A | 1/1998 |
| JP | 2000261449 A | 9/2000 |
| JP | 2002345014 A | 11/2002 |
| JP | 2005006019 A | 1/2005 |
| JP | 2005057550 A | 3/2005 |
| JP | 2005512426 A | 4/2005 |
| JP | 2005524358 A | 8/2005 |
| JP | 2005524359 A | 8/2005 |
| JP | 2005524360 A | 8/2005 |
| JP | 2006518562 T | 8/2006 |
| KR | 20030061547 A | 7/2003 |
| WO | WO9848586 | 10/1998 |
| WO | WO9938343 | 7/1999 |
| WO | WO0115476 | 3/2001 |
| WO | WO02060134 | 8/2002 |
| WO | WO03019805 | 3/2003 |
| WO | WO-03049475 A1 | 6/2003 |
| WO | 03094540 A1 | 11/2003 |
| WO | 03094542 A1 | 11/2003 |
| WO | WO03094539 A1 | 11/2003 |
| WO | WO-2004073210 A1 | 8/2004 |
| WO | WO2005034443 | 4/2005 |
| WO | WO2005088866 A1 | 9/2005 |

OTHER PUBLICATIONS

Taiwan Search Report—TW096125763—TIPO—Feb. 21, 2011.

* cited by examiner

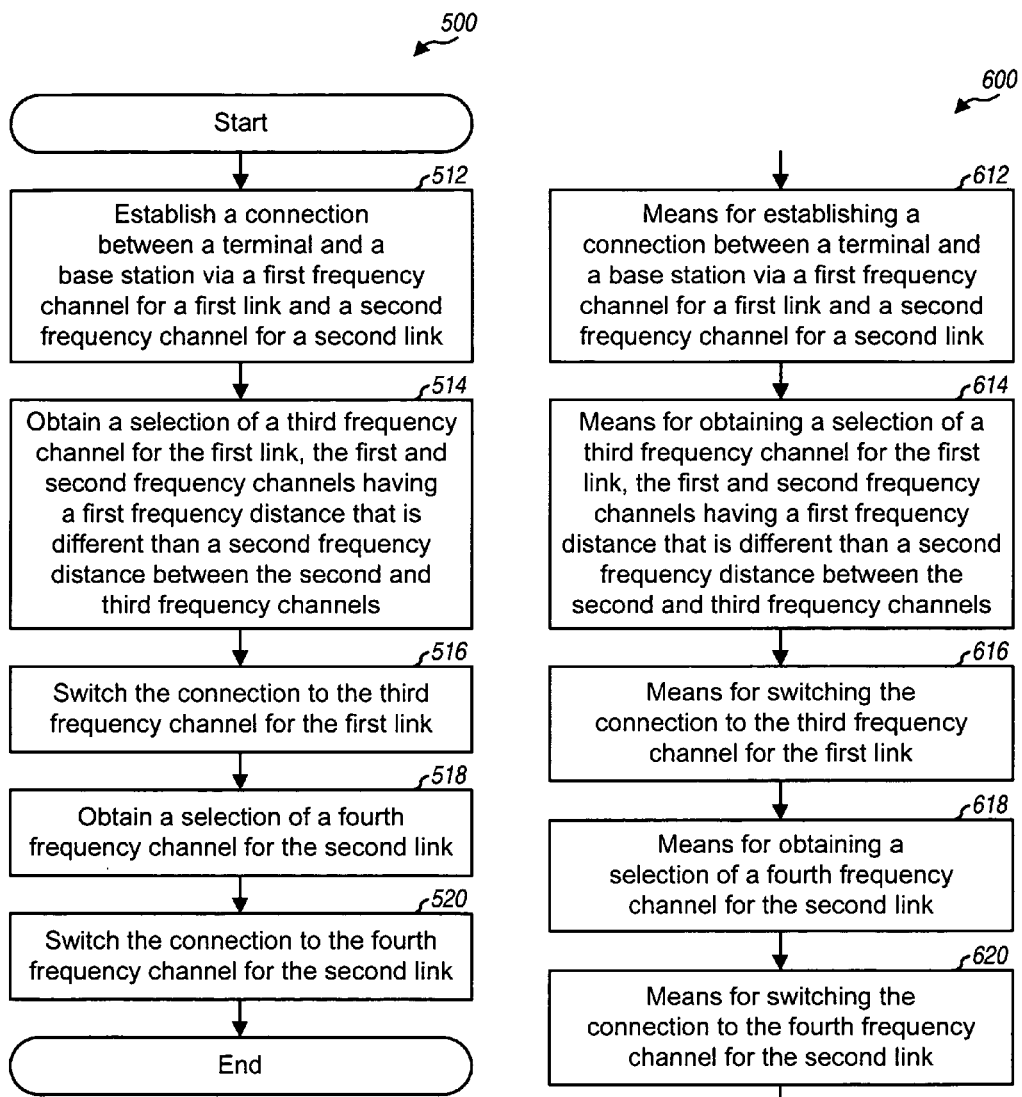

CONFIGURABLE DOWNLINK AND UPLINK CHANNELS FOR IMPROVING TRANSMISSION OF DATA BY SWITCHING DUPLEX NOMINAL FREQUENCY SPACING ACCORDING TO CONDITIONS

BACKGROUND

I. Field

The present disclosure relates generally to communication, and more specifically to transmission techniques for a wireless communication system.

II. Background

A wireless multiple-access communication system can concurrently support communication for multiple terminals on the downlink and uplink. The downlink (or forward link) refers to the communication link from the base stations to the terminals, and the uplink (or reverse link) refers to the communication link from the terminals to the base stations.

The system may utilize frequency division duplexing (FDD), which employs separate frequencies for the downlink and uplink. A base station and a terminal may communicate via a frequency channel for the downlink (or simply, a downlink channel) and a frequency channel for the uplink (or simply, an uplink channel). Each frequency channel has a specific bandwidth and is centered at a specific frequency. The distance or spacing between the downlink and uplink channels is typically fixed and referred to as the duplexing frequency. The base station transmits data and signaling to the terminal on the downlink channel, and the terminal transmits data and signaling to the base station on the uplink channel.

The base station may communicate with multiple terminals via the same pair of downlink and uplink channels. These terminals would then share the available radio resources. The same pair of downlink and uplink channels may also be used by a nearby base station for communication with other terminals. The transmissions to/from each base station may then act as interference to the transmissions to/from the other base station. The interference may adversely impact the performance of the terminals communicating with both base stations.

There is therefore a need in the art for techniques to transmit data in a manner to improve throughput and reduce interference.

SUMMARY

Transmission techniques using configurable channels for the downlink and/or uplink are described herein. The configurable channels may result in variable duplexing in an FDD system and may be viewed as a form of dynamic frequency reuse.

In an embodiment, the downlink channel and/or uplink channel may be independently selected for a terminal. The terminal may establish a connection with a base station on default downlink and uplink channels. The default downlink and uplink channels may be provisioned at the terminal or conveyed by the base station. Another downlink channel and/or another uplink channel may thereafter be selected based on various factors such as channel quality, loading, interference, and so on. The terminal would then switch to the new downlink and/or uplink channel for communication. The frequency distance between the downlink and uplink channels used by the terminal at any given moment may be different from the nominal duplexing frequency.

In another embodiment, the base stations broadcast sector information that may be used by the terminals for communication, sector selection, and/or channel selection. The sector information may include various types of information such as the downlink and uplink channels available for use, the frequencies of the available channels, the loading on the available channels, quality of service (QoS) information, and so on. A terminal may receive sector information from one or more sectors. The terminal may use the sector information to determine transmission parameters for the downlink and/or uplink, e.g., the uplink channel frequency. The terminal may also use the sector information to select a sector, a downlink channel, and/or an uplink channel, possibly without having to send any transmission on the uplink.

Various aspects and embodiments of the invention are described in further detail below.

BRIEF DESCRIPTION OF THE DRAWINGS

Aspects of embodiments of the invention will become more apparent from the detailed description set forth below when taken in conjunction with the drawings in which like reference characters identify correspondingly throughout.

FIGS. 5 and 6 show a process and an apparatus, respectively, for communicating using configurable channels.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
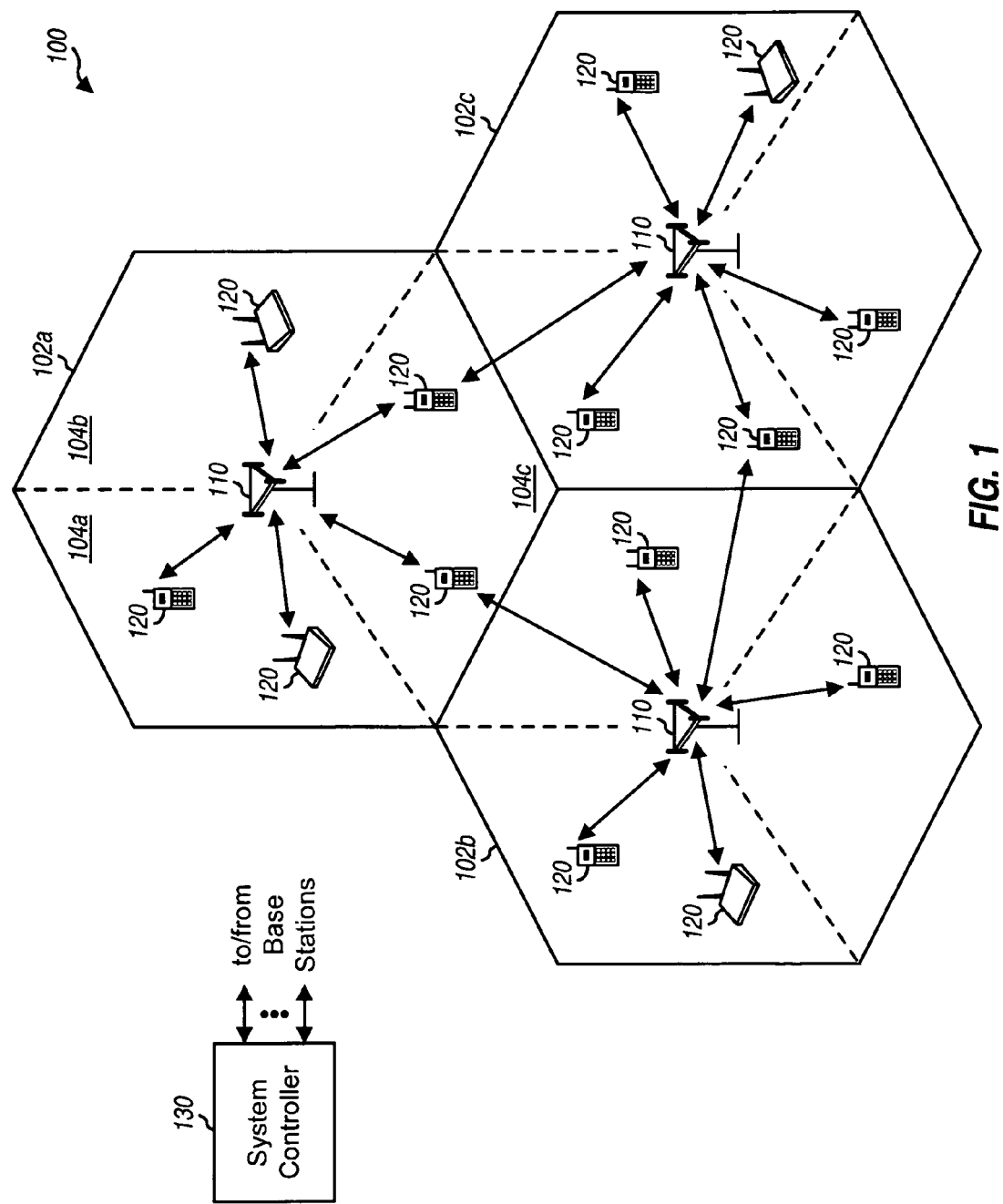
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, a Node B, an access point, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area may be served by a respective base station sector (BSS), which may also be referred to as a base transceiver subsystem (BTS). The term "sector" can refer to a BSS and/or its coverage area depending on the context in which the term is used. For a sectorized cell, the BSSs for all sectors of that cell are typically co-located within the base station for the cell. For simplicity, in the following description, the term "base station" generically refers to a station that serves a cell as well as a station that serves a sector.

For a centralized architecture, a system controller 130 couples to base stations 110 and provides coordination and control for these base stations. System controller 130 may be a single network entity or a collection of network entities. System controller 130 may also be called, and may contain some or all of the functionality of, a base station controller (BSC), a mobile switching center (MSC), a radio network controller (RNC), and/or some other network entity. For a distributed architecture, the base stations may communicate with one another as needed.

Terminals 120 may be dispersed throughout the system, and each terminal may be stationary or mobile. A terminal may also be called, and may contain some or all of the functionality of, a wireless terminal (WT), an access terminal (AT), a mobile station (MS), a user equipment (UE), a subscriber station and/or some other entity. A terminal may be a wireless device, a cellular phone, a personal digital assistant (PDA), a wireless modem, a handheld device, and so on. A terminal may communicate with one or more base stations on the downlink and uplink.

The transmission techniques described herein may be used for various wireless communication systems and networks. The terms "system" and "network" are often used interchangeably. For example, the techniques may be used for wireless wide area networks (WWANs), wireless metropolitan area networks (WMANs), wireless local area networks (WLANs), and wireless personal area networks (WPANs).

The transmission techniques may also be used for various multiple-access schemes such as Code Division Multiple Access (CDMA), Time Division Multiple Access (TDMA), Frequency Division Multiple Access (FDMA), Orthogonal FDMA (OFDMA), Single-Carrier FDMA (SC-FDMA), or a combination thereof, e.g., OFDMA and CDMA. OFDMA and SC-FDMA partition a frequency channel into multiple orthogonal tones, which are also called subcarriers, subbands, bins, and so on. Each tone may be modulated with data. In general, modulation symbols are sent in the frequency domain with OFDMA and in the time domain with SC-FDMA.

The transmission techniques may also be used for various radio technologies. For example, the techniques may be used for CDMA systems that implement cdma2000 and Wideband-CDMA (W-CDMA), TDMA systems that implement Global System for Mobile Communications (GSM), and OFDMA systems that implement Flash-OFDM® from Flarion Technologies, IEEE 802.11 a/g, IEEE 802.16, and IEEE 802.20. These various radio technologies are known in the art.

The techniques may also be used for FDD systems as well as time division duplexing (TDD) systems. An FDD system uses separate frequency channels for the downlink and uplink. A TDD system uses a single frequency channel for both the downlink and uplink.

Figure 2:
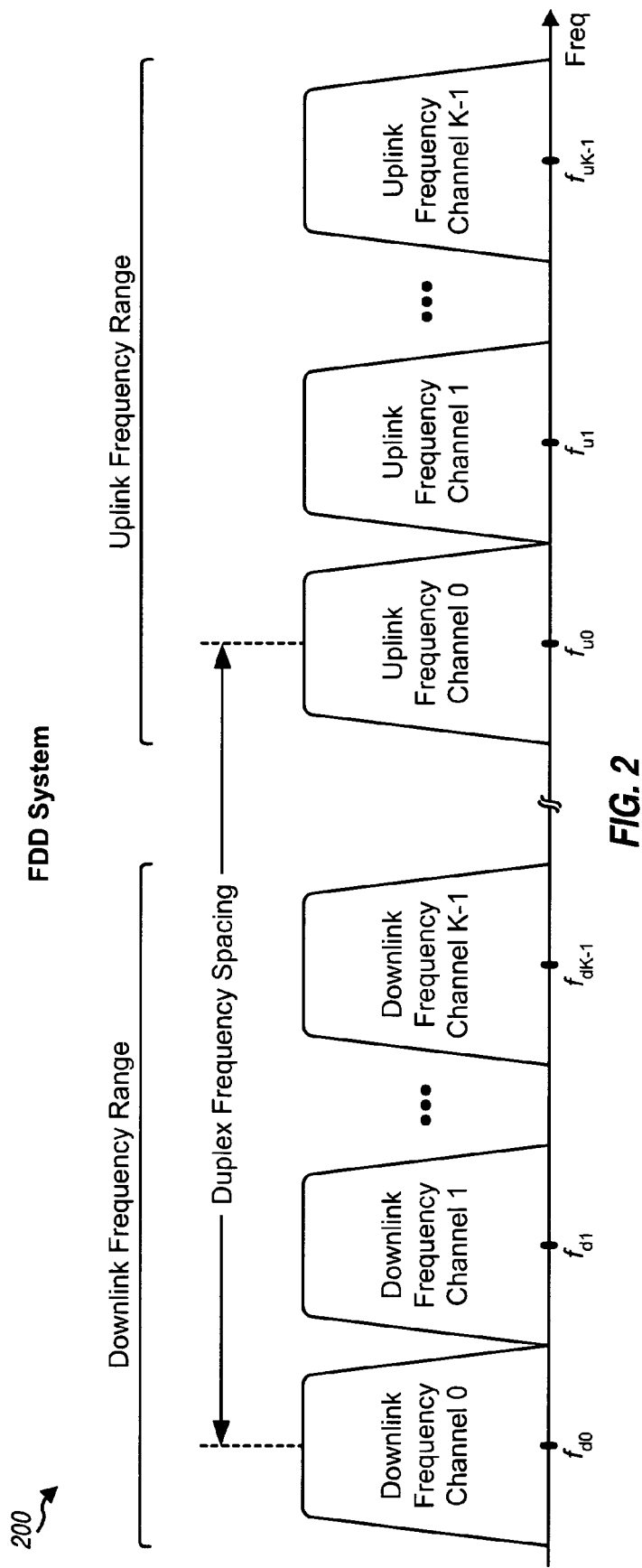
FIG. 2 shows an exemplary channel structure for an FDD system.

FIG. 2 shows an exemplary channel structure 200 that may be used in an FDD system. In structure 200, a frequency band includes a downlink frequency range and an uplink frequency range. The downlink frequency range is divided into multiple (K) downlink frequency channels (or simply, downlink channels) with indices 0 through K−1. Similarly, the uplink frequency range is divided into multiple (K) uplink frequency channels (or simply, uplink channels) with indices 0 through K−1. Each frequency channel has a particular bandwidth that is determined by system design. For example, a frequency channel may have a bandwidth of 1.25 MHz in cdma2000 and Flash-OFDM®, 5 MHz in W-CDMA, 200 KHz in GSM, or 20 MHz in IEEE 802.11. Each frequency channel is centered at a specific frequency that may be determined by a system operator or regulatory bodies. A frequency channel may also be referred to as a radio frequency (RF) channel, a carrier, a tone block, an OFDMA channel, a CDMA channel, and so on.

An FDD system typically uses fixed duplexing so that there is a one-to-one mapping between the downlink channels and the uplink channels. For example, downlink channel 0 may be associated with uplink channel 0, downlink channel 1 may be associated with uplink channel 1, and so on, and downlink channel K−1 may be associated with uplink channel K−1. With fixed duplexing, the use of a particular downlink channel also mandates the use of a specific uplink channel associated with this downlink channel.

Figure 3:
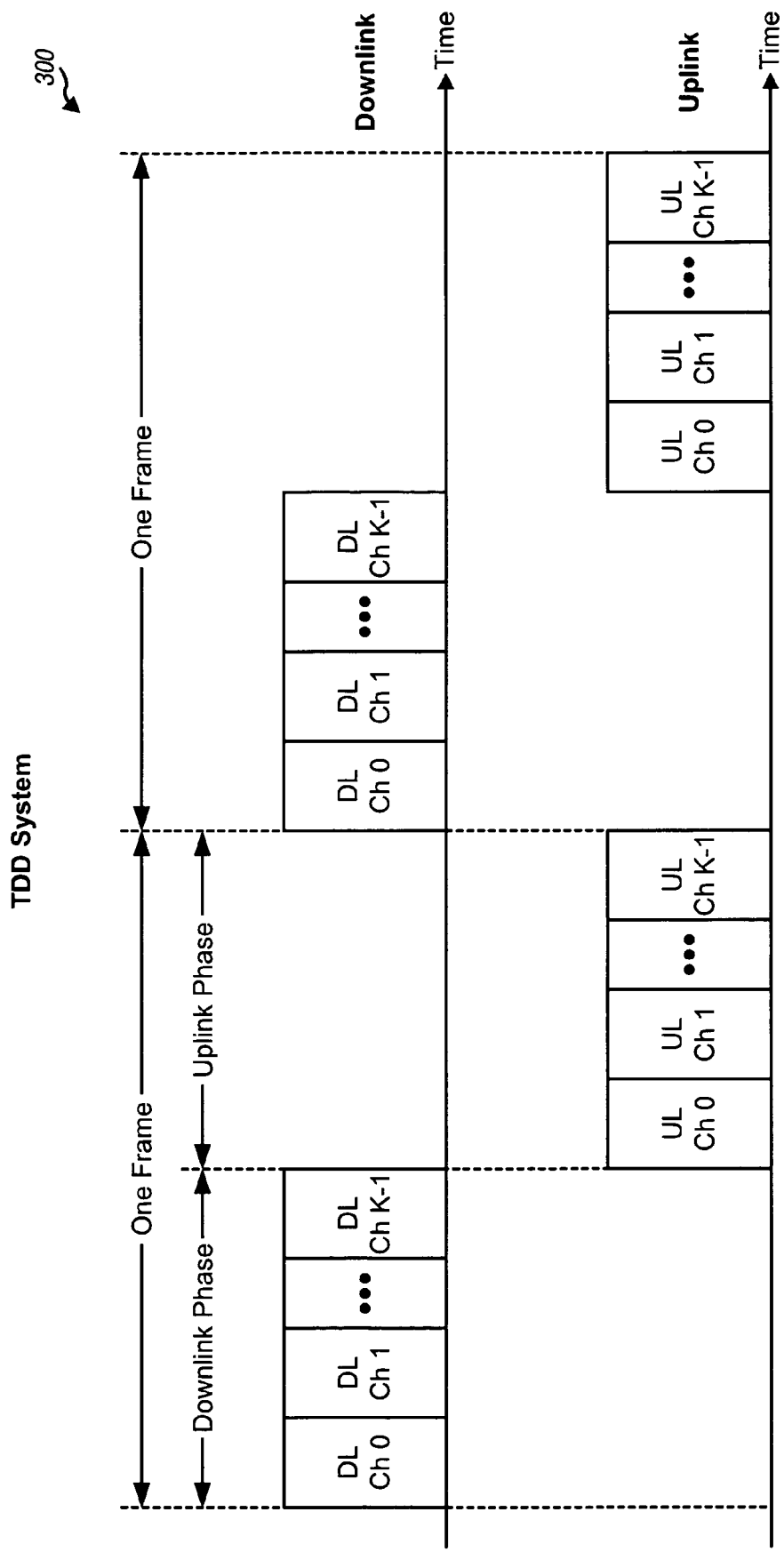
FIG. 3 shows an exemplary channel structure for a TDD system.

FIG. 3 shows an exemplary channel structure 300 that may be used in a TDD system. The transmission timeline may be partitioned into frames, with each frame having a predetermined time duration. Each frame may be partitioned into a downlink phase and an uplink phase. A base station may transmit data and signaling to terminals in the downlink phase, and the terminals may transmit data and signaling to the base station in the uplink phase. Each phase may be partitioned into multiple time slots. Each time slot of the downlink phase may be considered as a downlink channel (DL Ch), and each time slot of the uplink phase may be considered as an uplink channel (UL Ch). The downlink and uplink channels correspond to different time intervals in a TDD system but may be used in similar manner as the downlink and uplink channels in an FDD system.

The transmission techniques may be used for systems with sectorized cells as well as systems with un-sectorized cells. For clarity, much of the description below is for an FDD system with sectorized cells. An FDD system typically has multiple pairs of downlink and uplink channels available for use in a given geographic area. The available downlink and uplink channel pairs may be assigned to cells and sectors in the system in various manners.

Figure 4:
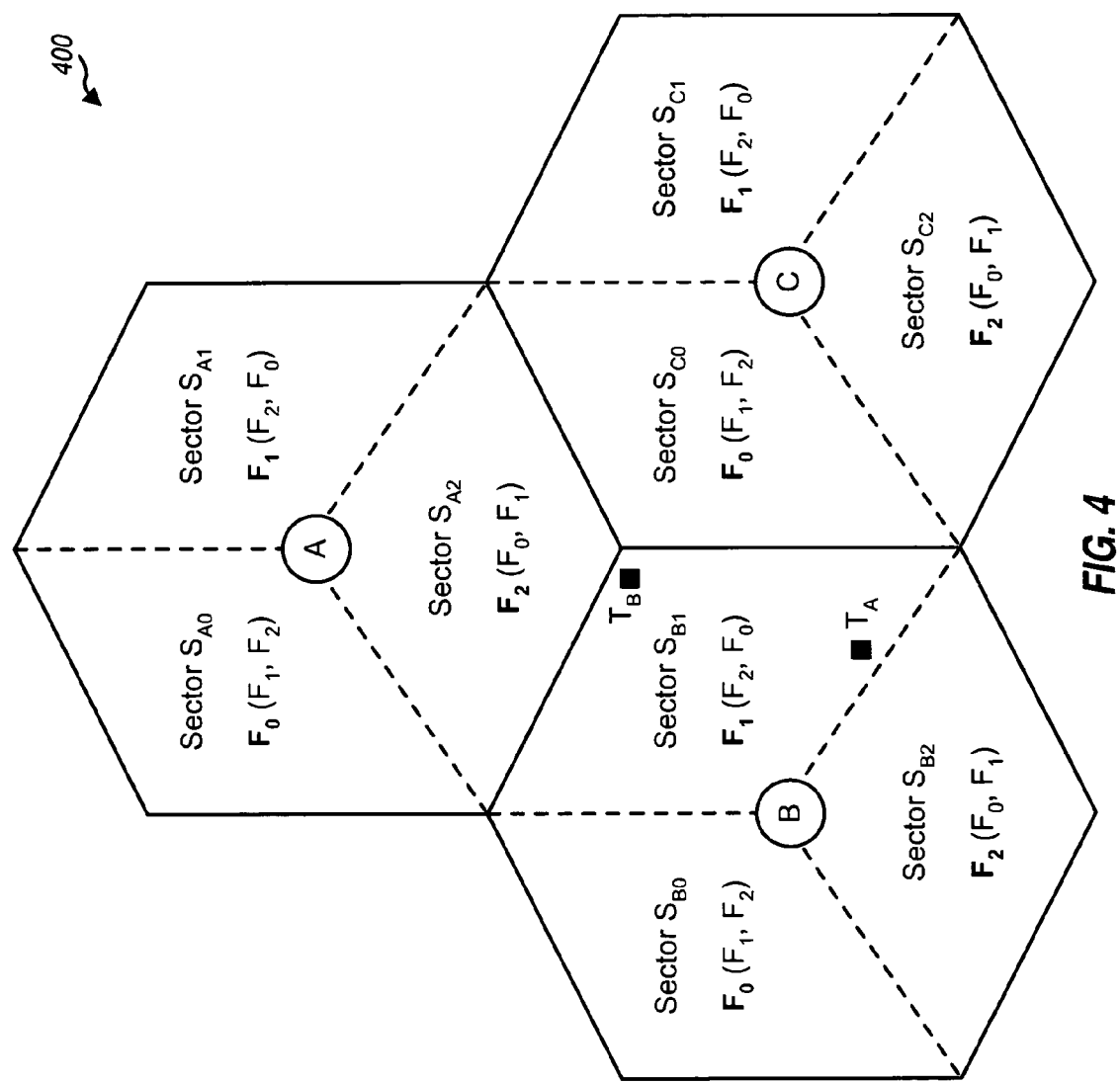
FIG. 4 shows an exemplary channel assignment for three-carrier operation.

FIG. 4 shows an embodiment of a channel assignment scheme 400 for three-carrier operation. For simplicity, FIG. 4 shows only three cells A, B and C. Each cell x is partitioned into three sectors $S_{x0}$, $S_{x1}$ and $S_{x2}$, for x∈{A, B, C}. Sectors $S_{x0}$, $S_{x1}$, and $S_{x2}$ may also be referred to as bssSectorType 0, 1 and 2, respectively.

In the embodiment shown in FIG. 4, the system has three downlink channels that are denoted as $F_0$, $F_1$ and $F_2$ and three uplink channels that are denoted as $U_0$, $U_1$ and $U_2$. On clarity, only the downlink channels are shown in FIG. 4. The three frequency channels for each link may be contiguous and separated by a predetermined frequency distance that is known to the sectors and the terminals. The three frequency channels for each link may also be non-contiguous and separated by non-standard frequency distances.

In channel assignment scheme 400, all three downlink and uplink channel pairs are assigned to each sector. For each sector, one downlink channel is designated as a primary downlink channel, and the other two downlink channels are designated as auxiliary downlink channels 1 and 2. Similarly, for each sector, one uplink channel is designated as a primary uplink channel, and the other two uplink channels are designated as auxiliary uplink channels 1 and 2. Different sectors have different primary downlink and uplink channels. In particular, channels $F_0$ and $U_0$ are respectively the primary downlink and uplink channels for sector $S_{x0}$, channels $F_1$ and $U_1$ are respectively the primary downlink and uplink channels for sector $S_{x1}$, and channels $F_2$ and $U_2$ are respectively the primary downlink and uplink channels for sector $S_{x2}$. For each sector, FIG. 4 shows the primary downlink channel in bolded text and the auxiliary downlink channels within parentheses.

The uplink channels are not shown in FIG. 4 for simplicity. Table 1 gives the primary and auxiliary frequency channels for each sector.

TABLE 1

|  | Sector $S_{x0}$ | Sector $S_{x1}$ | Sector $S_{x2}$ |
|---|---|---|---|
| Primary channels | $F_0$ and $U_0$ | $F_1$ and $U_1$ | $F_2$ and $U_2$ |
| Auxiliary channels 1 | $F_1$ and $U_1$ | $F_2$ and $U_2$ | $F_0$ and $U_0$ |
| Auxiliary channels 2 | $F_2$ and $U_2$ | $F_0$ and $U_0$ | $F_1$ and $U_1$ |

In an OFDMA system, a set of tones may be defined for each frequency channel and may be referred to as a tone block. Three tone blocks 0, 1 and 2 may be defined for downlink channels $F_0$, $F_1$ and $F_2$, and three tone blocks may be defined for uplink channels $U_0$, $U_1$ and $U_2$. The tone block for the primary frequency channel may be referred to as tier 0 tone block. The tone blocks for auxiliary frequency channels 1 and 2 may be referred to as tier 1 tone block and tier 2 tone block, respectively. Table 2 gives the tone blocks for each sector and is equivalent to Table 1.

TABLE 2

|  | bssSectorType = 0 | bssSectorType = 1 | bssSectorType = 2 |
|---|---|---|---|
| Tier 0 tone block | Tone block 0 | Tone block 1 | Tone block 2 |
| Tier 1 tone block | Tone block 1 | Tone block 2 | Tone block 0 |
| Tier 2 tone block | Tone block 2 | Tone block 0 | Tone block 1 |

Each sector may serve the terminals in that sector using the assigned frequency channels/tone blocks. If the system uses fixed duplexing, then a terminal communicating with a sector on downlink channel $F_0$ would also use uplink channel $U_0$, a terminal communicating with a sector on downlink channel $F_1$ would also use uplink channel $U_1$, and a terminal communicating with a sector on downlink channel $F_2$ would also use uplink channel $U_2$. The fixed duplexing may simplify system operation but may result in sub-optimal performance. For example, a terminal using downlink channel $F_0$ may find uplink channel $U_0$ congested or may observe high level of interference on uplink channel $U_0$. However, the fixed duplexing would require the terminal to use uplink channel $U_0$, unless the terminal selects a different pair of downlink and uplink channels, if available.

In an aspect, configurable downlink and/or uplink channels are used for a terminal to improve performance. In general, a system may support only configurable downlink channels (e.g., for a deployment with multiple downlink channels and a single uplink channel), only configurable uplink channels (e.g., for a deployment with multiple uplink channels and a single downlink channel), or configurable downlink and uplink channels. With configurable channels, a suitable downlink channel and/or a suitable uplink channel may be selected for a terminal to achieve good performance. The use of configurable channels may result in variable duplexing and may be viewed as a form of dynamic frequency reuse (DFR).

In an embodiment, a terminal initially establishes a connection with a sector on default downlink and uplink channels, which may also be referred to as preferred or designated channels. A connection may be considered as a collection of channels established between the terminal and the sector for the physical (PHY) and/or Medium Access Control (MAC) layers. The default downlink and uplink channels may be provisioned at the terminal and may result from licensed or unlicensed spectrum allocation and/or spectrum planning. For example, the default downlink and uplink channels may be the primary downlink and uplink channels, which may be different for different sectors as shown in FIG. 4. The terminal may thereafter switch to another downlink channel and/or another uplink channel, which may be selected based on various factors as described below.

The selection of a new downlink channel and/or a new uplink channel may be made by the sector or the terminal. In an embodiment, the sector selects a new downlink channel and/or a new uplink channel for the terminal and sends a message for a change to the new channel(s). The message may be a directive that is followed by the terminal or a request that may be accepted or rejected by the terminal. The sector may send the message on a control channel, a traffic channel, or a broadcast channel. In another embodiment, the terminal may make measurements for different downlink channels and/or obtain information for different uplink channels. The terminal may select a new downlink channel and/or a new uplink channel based on the measurements and/or information. The terminal may send a message for a change to the new channel(s). For both embodiments, the change to the new channel(s) may occur at a designated time that is known to both the sector and the terminal.

At the designated time, the terminal tunes to the new downlink channel and/or the new uplink channel and thereafter uses these channels for communication with the sector. After RF tuning takes effect, the frequency distance between the downlink and uplink channels may be different from the frequency distance between the default downlink and uplink channels. The variable duplexing may be achieved with appropriate RF circuitry such as duplexers, filters, and local oscillators in the RF transmit and receive chains. The RF tuning may be performed relatively quickly (e.g., in milliseconds) with RF circuitry currently available. Hence, data connectivity at higher layers may be maintained through channel switching, and impact to user applications may be minimal.

In general, the selection of new downlink and/or uplink channels may be made based on various factors such as channel quality, loading, interference, and so on. The channel selection may consider channel qualities of the frequency channels. Different frequency channels may observe different channel conditions, e.g., different fading, multipath, and interference effects. Consequently, these frequency channels may have different channel qualities, which may be quantified by signal-to-noise ratio (SNR) or some other measure. A terminal may estimate the channel qualities of different downlink channels based on pilots and/or other transmissions sent by a sector. The sector may also estimate the channel qualities of the uplink channels based on transmissions from the terminal. Downlink and uplink channels with good channel qualities may be selected for use.

The channel selection may take into account loading, which refers to the amount of traffic being sent, e.g., on a frequency channel of a sector. Loading may be quantified by the number of users or connections, the QoS profiles of these users, and/or other criteria. A QoS profile may convey the type(s) of traffic being sent and the traffic requirements. The channel selection may be performed in a manner to balance loading across frequency channels, across sectors, and/or across cells.

It is desirable to balance the loading of different frequency channels of a given sector. This may be achieved by determining the loading of each frequency channel on each link.

For each link, new connections may be established on frequency channels with less loading and/or existing connections may be moved to more lightly loaded frequency channels.

It is also desirable to balance the loads of different sectors of a given cell and also across adjacent cells. If a terminal is located near the coverage edge of two sectors, then the terminal may switch from one (more heavily loaded) frequency channel of one sector to another (more lightly loaded) frequency channel of another sector. Similarly, if the terminal is located near the coverage edge of two cells, then the terminal may switch from one (more heavily loaded) frequency channel of one cell to another (more lightly loaded) frequency channel of another cell. Load balancing across sectors or cells may be achieved, e.g., by exchanging pertinent information on the available frequency channels, the number of users, the QoS profiles of the users, and/or other information among the sectors or cells. Information may be exchanged among sectors of a given cell via a backplane of a base station. Information may be exchanged among cells via backhaul networks.

In general, load balancing may be performed across frequency channels of a sector, across sectors of a cell, and/or across cells. Dynamic load balancing may improve QoS for all users. Load balancing may be performed by the sectors and/or the terminals. A sector typically has information on the users and their QoS profiles and further controls usage of radio resources on the downlink and uplink. A sector may request changes in downlink and/or uplink channels for terminals in order to balance loading. A sector may also broadcast loading information. The terminals may then consider the loading information in selecting downlink and/or uplink channels.

The channel selection may be performed in a manner to mitigate inter-sector interference and inter-cell interference. Transmissions for terminals in one sector (or cell) are typically not orthogonal to transmissions for terminals in other sectors (or cells) and thus cause inter-sector (or inter-cell) interference. If a terminal is located in the boundary of two sectors, then the terminal may be assigned downlink and uplink channels that reduce the impact of inter-sector interference. For example, in FIG. 4, a sector-edge terminal $T_A$ in sector $S_{B1}$ may be assigned downlink channel $F_1$. Adjacent sector $S_{B2}$ may use downlink channel $F_1$ for interior terminals that can tolerate more interference. Terminal $T_A$ may also be restricted to transmitting to one sector to reduce inter-sector interference. Similarly, if a terminal is located in the boundary of multiple cells, then the terminal may be assigned downlink and uplink channels that reduce the impact of inter-cell interference. For example, in FIG. 4, a cell-edge terminal TB in sector $S_{B1}$ may be assigned downlink channel $F_1$, which is an auxiliary channel for adjacent cells A and C. Cells A and C may use downlink channel $F_1$ for interior terminals that can tolerate more interference. The sectors or cells may exchange information on the frequency channels used by each sector or cell, the interference observed on each frequency channel, the types of terminal assigned on each frequency channel, and so on. This information may be used by neighbor sectors or cells to assign frequency channels in a manner to mitigate the impact of inter-sector and inter-cell interference.

The channel selection may also take into consideration interference from other sources that may degrade the transmissions between the sectors and terminals. This interference may come from other radio technologies (e.g., near borders between regions with different spectrum policies), rogue transmitters, and so on. If high interference is observed on a given frequency channel, then another frequency channel may be selected for use.

The channel selection may also take into consideration other factors besides those described above.

A new downlink channel and/or a new uplink channel may be selected whenever appropriate. For example, a terminal may periodically measure the received powers or estimate the channel qualities of other downlink channels for a serving sector and/or search for better downlink channels of other sectors. A new downlink channel of the serving sector or another sector may be selected if better than the current downlink channel.

The selection of new downlink and/or uplink channels may be conveyed using various mechanisms. A sector may send channel changes in broadcast control messages to all terminals, multicast control messages to groups of terminals, and/or unicast control messages to specific terminals. A terminal may send channel changes in unicast control messages. In general, the messages may be sent on broadcast, control, and/or traffic channels.

Configurable channels may be implemented on a per sector basis, and channel selection may be performed independently by each sector. Configurable channels may also be implemented on a per cell basis, and channel selection may be performed independently by each cell. Configurable channels may also be implemented across a group of sectors or cells. In any case, configurable channels may be implemented in a manner to observe any applicable regulatory or co-existence restrictions.

FIG. 5 shows an embodiment of a process 500 for communicating using configurable channels. Process 500 may be performed by a terminal or a base station.

A connection between the terminal and the base station is established via a first frequency channel for a first link and a second frequency channel for a second link (block 512). A selection of a third frequency channel for the first link is obtained (block 514). The connection is switched to the third frequency channel for the first link (block 516). The connection is maintained with the second frequency channel for the second link after switching to the third frequency channel for the first link. The first and second frequency channels have a first frequency distance that is different than a second frequency distance between the second and third frequency channels. This difference may be at least the spacing between adjacent frequency channels for the first link or the second link.

The first and second links may be the downlink and uplink, respectively, and the first and second frequency channels may be default frequency channels for the downlink and uplink, respectively. The third frequency channel may be selected from a set of downlink frequency channels available for the base station. Alternatively, the first and second links may be the uplink and downlink, respectively, and the first and second frequency channels may be default frequency channels for the uplink and downlink, respectively. The third frequency channel may be selected from a set of uplink frequency channels available for the base station.

The third frequency channel may be selected in response to (1) less loading detected on the third frequency channel than the first frequency channel, (2) less interference detected on the third frequency channel than the first frequency channel, (3) better channel conditions detected on the third frequency channel than the first frequency channel, and/or (4) some other factors. The selection of the third frequency channel may be made by the base station and sent to the terminal or made by the terminal and sent to the base station.

A selection of a fourth frequency channel for the second link may be obtained (block 518). The connection may then be switched to the fourth frequency channel for the second link (block 520). The third and fourth frequency channels may have a third frequency distance that is different than the first and second frequency distances.

FIG. 6 shows an embodiment of an apparatus 600 for communicating using configurable channels. Apparatus 600 includes means for establishing a connection between a terminal and a base station via a first frequency channel for a first link and a second frequency channel for a second link (block 612), means for obtaining a selection of a third frequency channel for the first link (block 614), means for switching the connection to the third frequency channel for the first link (block 616), means for obtaining a selection of a fourth frequency channel for the second link (block 618), and means for switching the connection to the fourth frequency channel for the second link (block 620).

In another aspect, the sectors broadcast sector information that may be used by the terminals for proper operation, sector selection, and/or channel selection. The sector information may also be called carrier BSS information, carrier BS information, carrier information, and so on. Each sector may broadcast its sector information on only the primary downlink channel or on each downlink channel. A terminal may receive sector information from one or more sectors, e.g., strongly received sector(s). The terminal may use the sector information to select a sector, a downlink channel, and/or an uplink channel. The terminal may be able to perform sector and/or channel selection without having to send any transmission on the uplink.

In general, the sector information may comprise any type of information that may be pertinent for proper operation, sector selection, and/or channel selection. For example, the sector information may indicate which frequency channels are the primary and auxiliary channels, which downlink and uplink channels are available for use, the frequency distances between the downlink channels, the frequency distances between the uplink channels, the frequency distances between the downlink and uplink channels, the loading on each uplink channel, the loading on each downlink channel, a power backoff for each auxiliary channel, QoS information for each channel, and so on, or any combination thereof. The sector information may be conveyed in various manners.

In an embodiment, each sector transmits a known signal on each downlink channel. The known signal may be used for sector detection and identification and may be a beacon, a known sequence, a pilot, or some other signal. A beacon is a high-power transmission sent on a specific frequency or tone. Each sector may transmit beacons on three downlink channels in a manner such that the terminals can identify the primary channel as well as auxiliary channels 1 and 2 based on the beacons. For example, sector $S_{x0}$ may transmit beacons on tone blocks 0, 1 and 2 in superslots (or time intervals) 0, 1 and 2, respectively, sector $S_{x1}$ may transmit beacons on tone blocks 1, 2 and 0 in superslots 0, 1 and 2, respectively, and sector $S_{x2}$ may transmit beacons on tone blocks 2, 0 and 1 in superslots 0, 1 and 2, respectively. In this embodiment, the terminals are able to determine the primary and auxiliary channels of each sector based on the beacons received from that sector.

Each sector has a set of downlink channels available for use and a set of uplink channels available for use. In an embodiment, the available downlink channels are independent of the available uplink channels. For example, one sector may use three downlink channels and two uplink channels, another sector may use two downlink channels and three uplink channels, and so on. The number of available frequency channels for each link may be selected based on various factors such as sector loading, interference, and so on. In another embodiment, the available downlink channels are tied to the available uplink channels. For example, one sector may use only the primary downlink and uplink channels, another sector may use the primary downlink and uplink channels as well as auxiliary downlink and uplink channels 1, and another sector may use all three downlink and uplink channel pairs.

In an embodiment, each sector uses the primary downlink and uplink channels and may or may not use the auxiliary downlink and uplink channels. Table 3 lists four possible configurations for a sector. Each configuration corresponds to a different set of frequency channel(s) used by a sector.

TABLE 3

|  | bssToneBlock Config = 0 | bssToneBlock Config = 1 | bssToneBlock Config = 2 | bssToneBlock Config = 3 |
|---|---|---|---|---|
| Tier 0 tone block | Used | Used | Used | Used |
| Tier 1 tone block | Used | Not used | Used | Not used |
| Tier 2 tone block | Used | Used | Not used | Not used |

The sector information may convey the downlink channels and/or the uplink channels available for use. The sector information may convey both the available downlink channels and the available uplink channels, if these channels may be selected independently of one another. The sector information may also convey only the available downlink channels, e.g., if the downlink and uplink channels are selected in pairs. The sector information may also indicate a specific downlink channel and/or a specific uplink channel to use.

In an embodiment, the frequency channels available for use are conveyed by power backoffs for the auxiliary channels. The power backoff for a given auxiliary channel is a power ratio of the nominal (e.g., per-tone) transmission power used for the primary channel to the nominal transmission power used for that auxiliary channel. A power backoff of 0 decibel (dB) indicates that the same transmission power can be used for the primary and auxiliary channels, a power backoff of more than 0 dB indicates that less transmission power can be used for the auxiliary channel than the primary channel, and a power backoff of infinity indicates that the auxiliary channel cannot be used. Table 4 gives the configuration of a sector based on the power backoffs for the auxiliary channels. In Table 4, bssPowerBackoff01 is the power backoff for auxiliary channel 1, and bssPowerBackoff02 is the power backoff for auxiliary channel 2.

TABLE 4

| bssPowerBackoff01 | bssPowerBackoff02 | bssToneBlockConfig |
|---|---|---|
| Not equal to infinity dB | Not equal to infinity dB | 0 |
| Equal to infinity dB | Not equal to infinity dB | 1 |

TABLE 4-continued

| bssPowerBackoff01 | bssPowerBackoff02 | bssToneBlockConfig |
|---|---|---|
| Not equal to infinity dB | Equal to infinity dB | 2 |
| Equal to infinity dB | Equal to infinity dB | 3 |

The sector information may convey an uplink (UL) loading factor for each of the uplink channels supported by a sector. The UL loading factor for a given uplink channel indicates the amount of loading on that uplink channel at the sector. The UL loading factor may be given by a rise over thermal (ROT), an interference over thermal (IOT), and/or some other measure known in the art. The terminals can ascertain the loading on a given uplink channel based on the UL loading factor for that uplink channel.

The sector information may convey loading information for downlink channels supported by a sector. The loading information for the downlink may be given in the same or different format than the loading information for the uplink channels. The sector information may also indicate which downlink channels are available for use in the sector as well as the power backoff for each available downlink channel.

The sector information may convey the frequency distances between the downlink channels and/or the frequency distances between the uplink channels, if these frequency channels are not contiguous. The downlink and uplink channels may be symmetrical so that the frequency distance between auxiliary downlink channel y and the primary downlink channel is equal to the frequency distance between auxiliary uplink channel y and the primary uplink channel, for y=1, 2. In this case, the frequency distances for the downlink channels also apply to the uplink channels. The frequency distance between auxiliary channel 1 and the primary channel may be denoted as FrequencyOffset10, and the frequency distance between auxiliary channel 2 and the primary channel may be denoted as FrequencyOffset10. The frequency distance may be given in a predetermined unit (e.g., the spacing between adjacent tones in a tone block). If the downlink and uplink channels are not symmetrical, then the sector information may include the frequency distances for the downlink channels as well as the frequency distances for the uplink channels. In any case, the frequency distances may be used to find the auxiliary channels.

The sector information may convey the center frequencies of the uplink channels. In a typical system deployment, each downlink channel has a corresponding uplink channel that is located at a fixed frequency distance away. In this case, the frequencies of the uplink channels may be determined based on the frequencies of the downlink channels. However, a system deployment may have uplink channels that are not separated from the corresponding downlink channels by the fixed frequency distance. In this case, the sector information may convey the center frequencies of the uplink channels. The terminals can ascertain the locations of the uplink channels based on the sector information.

The sector information may also convey QoS information for the downlink and/or uplink channels. The system may support multiple priority levels, e.g., high, normal, and low priority. The QoS information for a given frequency channel may indicate, e.g., the number of users in each priority level, the amount of traffic in each priority level, the minimum priority level needed to access the frequency channel, and so on. A terminal may select a frequency channel with less traffic at higher priority levels so that the terminal can be adequately served.

Table 5 shows an embodiment of the sector information that is broadcast by a sector. The sector information may also comprise different combination of information, and this is within the scope of the present invention.

TABLE 5

| Parameter | Description |
|---|---|
| FrequencyOffset10 | Frequency distance between auxiliary channel 1 and primary channel |
| FrequencyOffset20 | Frequency distance between auxiliary channel 2 and primary channel |
| bssPowerBackoff01 | Transmission power backoff for auxiliary channel 1 |
| bssPowerBackoff02 | Transmission power backoff for auxiliary channel 2 |
| UL loading factor 0 | Loading factor for primary uplink channel |
| UL loading factor 1 | Loading factor for auxiliary uplink channel 1 |
| UL loading factor 2 | Loading factor for auxiliary uplink channel 2 |

A terminal may estimate the channel qualities of the downlink channels of one or more sectors that can be received by the terminal. The terminal may select a sector, e.g., the sector with the strongest downlink channel, and may obtain sector information from the selected sector. The terminal may use the sector information in various manners. In an embodiment, the sector information conveys the frequencies of the uplink channels, which are not at fixed distance from the corresponding downlink channels. The terminal may then transmit on an uplink channel at the frequency indicated by the sector information. In another embodiment, the sector information conveys loading, QoS, and/or other information for the uplink channels. The terminal may then select an uplink channel based on the sector information.

The UL loading factors broadcast by a sector may be used to balance the loads on the uplink channels. In an embodiment, when a terminal first accesses a sector, the UL loading factors of the primary and auxiliary uplink channels are obtained from the sector and used to select an uplink channel, e.g., the uplink channel with the lightest load. In another embodiment, if the loading of the current uplink channel exceeds the loading of another uplink channel by a predetermined amount, then a switch is made to the more lightly loaded uplink channel.

The sector information may be used to select a sector, a downlink channel, and/or an uplink channel at the start of communication. A connection may be established with the selected sector on the selected downlink and uplink channels. The sector information may also be used to (1) switch the existing connection to a new downlink channel and/or a new uplink channel of the current sector, or (2) add a new connection on a new downlink channel and/or a new uplink channel with the current sector (e.g., for additional traffic) or another sector (e.g., for handoff).

Figure 7:
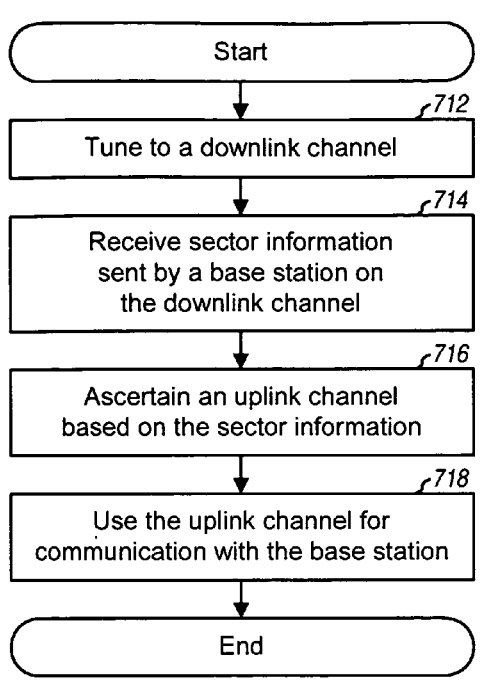
FIGS. 7 and 8 show a process and an apparatus, respectively, for determining frequency channels to use for communication.

FIG. 7 shows an embodiment of a process 700 for determining frequency channels to use for communication. Process 700 may be performed by a terminal. The terminal tunes to a downlink channel, which may be detected based on beacons or pilots transmitted on the downlink (block 712). The terminal receives sector information sent (e.g., broadcast) by a base station on the downlink channel (block 714). The terminal ascertains an uplink channel based on the sector information (block 716). The terminal then uses the uplink channel for communication with the base station (block 718).

The sector information may indicate a specific uplink channel to use for communication, and the terminal may then use this uplink channel. The sector information may indicate the center frequency of the uplink channel, and the terminal may tune its transmitter to this center frequency. The sector information may indicate multiple uplink channels available for use and may further indicate loading, QoS, and/or other information for these uplink channels. The terminal may then select the uplink channel by considering the loading, QoS, and/or other information for the uplink channels. The terminal may also use the sector information in other manners for the uplink.

The sector information may include information (e.g., center frequencies) for additional downlink channels. The terminal may acquire each additional downlink channel and determine the channel conditions of each downlink channel. The terminal may select one downlink for use from among all available downlink channels.

The terminal may send an access request on the selected uplink channel to the base station. The terminal may also establish a connection with the base station via the selected downlink and uplink channels.

Figure 8:
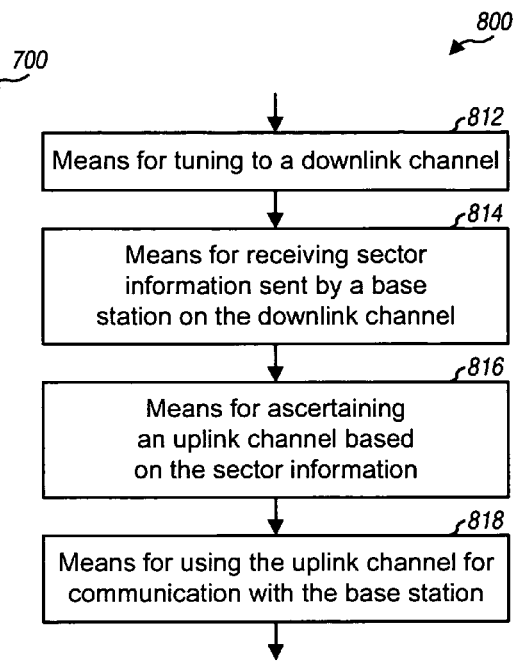

FIG. 8 shows an embodiment of an apparatus 800 for determining frequency channels to use for communication. Apparatus 800 includes means for tuning to a downlink channel (block 812), means for receiving sector information sent by a base station on the downlink channel (block 814), means for ascertaining an uplink channel based on the sector information (block 816), and means for using the uplink channel for communication with the base station (block 818).

The transmission techniques and configurable channels described herein may provide certain advantages. Improved QoS and/or reduced interference may be achieved by selecting appropriate downlink and/or uplink channels for use. This may result in enhanced coverage, capacity and/or performance for the system.

Figure 9:
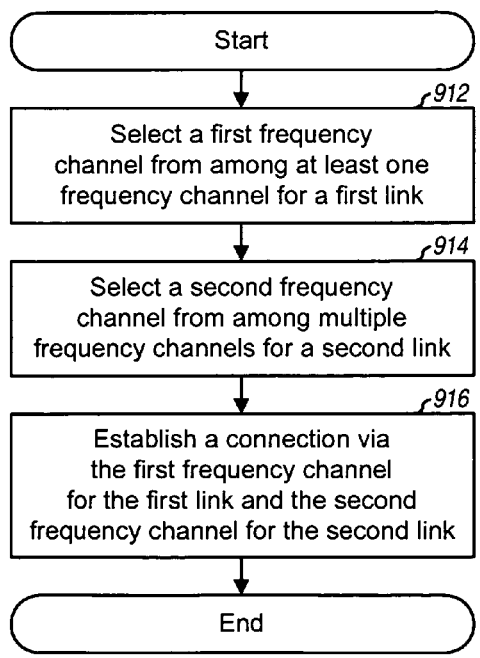
FIGS. 9 and 10 show a process and an apparatus, respectively, for establishing a connection with configurable channels.

FIG. 9 shows an embodiment of a process 900 for establishing a connection with configurable channels. A first frequency channel is selected from among at least one frequency channel for a first link, e.g., the downlink (block 912). The first frequency channel may be selected based on measurements for the frequency channel(s) for the first link, sector information received from one of the frequency channel(s), and/or some other information. A second frequency channel is selected from among multiple frequency channels for a second link, e.g., the uplink (block 914). The second frequency channel may be selected based on the sector information and/or some other information. A connection is established via the first frequency channel for the first link and the second frequency channel for the second link (block 916).

The multiple frequency channels for the second link may be associated with the frequency channel(s) for the first link. The multiple frequency channels for the second link may include the second frequency channel and a third frequency channel, where the frequency distance between the first and second frequency channels and the frequency distance between the first and third frequency channels are different by at least the spacing between adjacent frequency channels for the second link.

Figure 10:
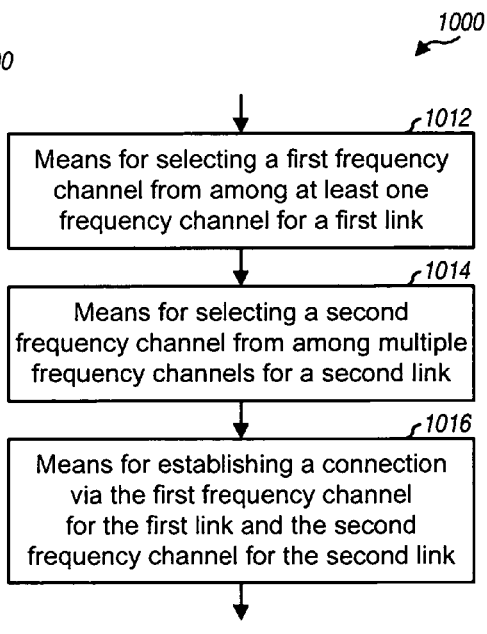

FIG. 10 shows an embodiment of an apparatus 1000 for establishing a connection with configurable channels. Apparatus 1000 includes means for selecting a first frequency channel from among at least one frequency channel for a first link (block 1012), means for selecting a second frequency channel from among multiple frequency channels for a second link (block 1014), and means for establishing a connection via the first frequency channel for the first link and the second frequency channel for the second link (block 1016).

Figure 11:
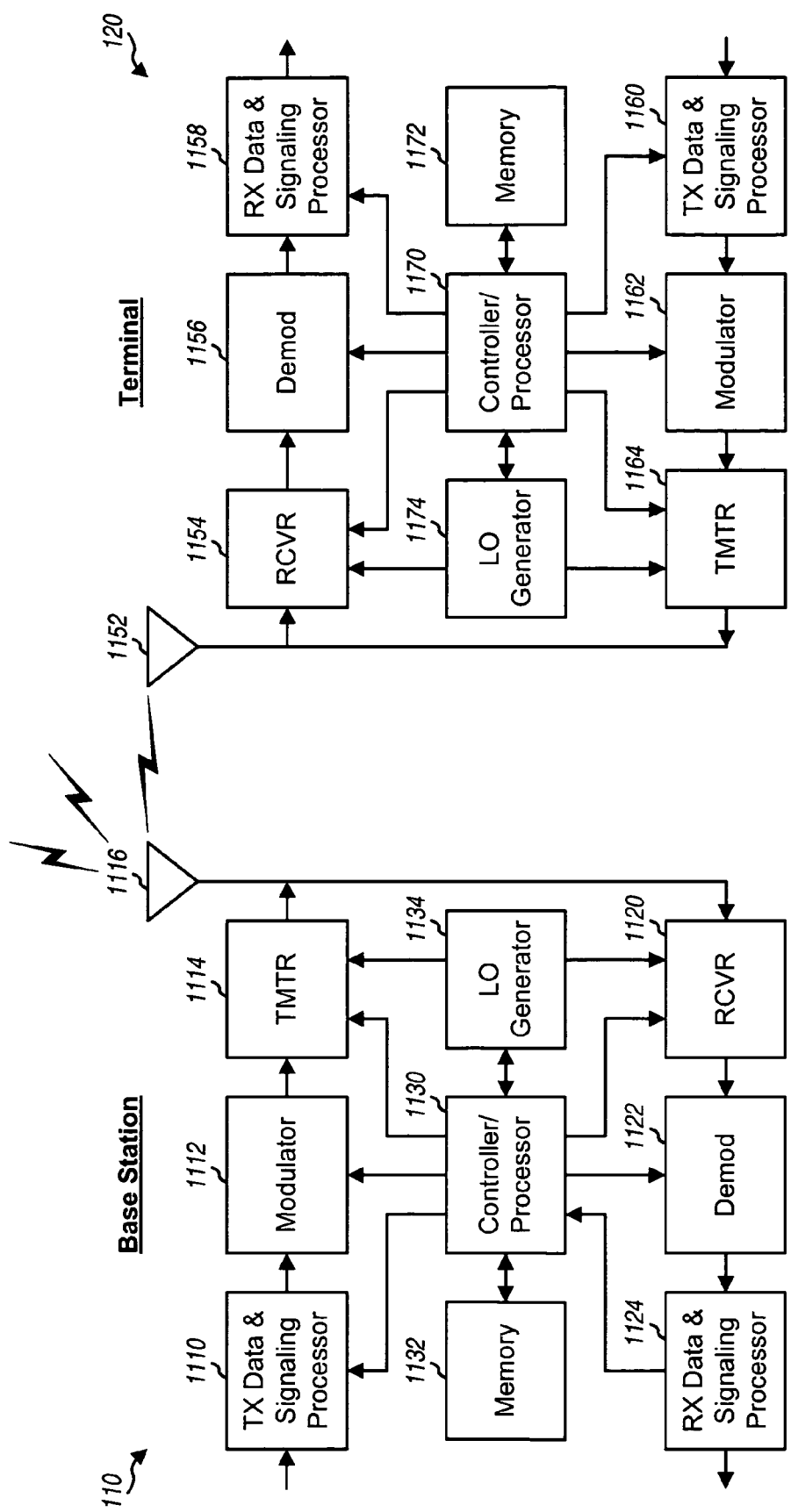
FIG. 11 shows a block diagram of a base station and a terminal.

FIG. 11 shows a block diagram of an embodiment of a base station 110 and a terminal 120 in FIG. 1. At base station 110, a transmit (TX) data and signaling processor 1110 receives traffic data for the terminals being served, signaling (e.g., messages to switch channels), and overhead data (e.g., sector information) for each downlink channel. Processor 1110 processes (e.g., formats, encodes, interleaves, and symbol maps) the traffic data, signaling, overhead data, and pilot for each downlink channel and provides output symbols for the downlink channel. A modulator 1112 performs modulation on the output symbols for each downlink channel and generates chips. Modulator 1112 may perform modulation for OFDM, CDMA, and/or other radio technologies. A transmitter (TMTR) 1114 conditions (e.g., converts to analog, filters, amplifies, and upconverts) the chips and generates a downlink signal containing a modulated signal component for each downlink channel. The downlink signal is transmitted via an antenna 1116.

At terminal 120, an antenna 1152 receives downlink signals from base station 110 and other base stations and provides a received signal to a receiver (RCVR) 1154. Receiver 1154 conditions and digitizes the received signal and provides samples. A demodulator (Demod) 1156 performs demodulation on the samples for each downlink channel of interest and provides symbol estimates for the downlink channel. A receive (RX) data and signaling processor 1158 processes (e.g., symbol demaps, deinterleaves, and decodes) the symbol estimates for the downlink channel assigned to terminal 120 and provides decoded data and signaling for terminal 120. Processor 1158 may also process the symbol estimates to obtain decoded overhead data, e.g., sector information. Demodulator 1156 and RX data and signaling processor 1158 perform processing complementary to the processing performed by modulator 1112 and TX data and signaling processor 1110, respectively.

For the uplink, a TX data and signaling processor 1160 generates output symbols for traffic data, signaling, and pilot to be sent to base station 110. A modulator 1162 performs modulation on the output symbols and generates chips. A transmitter 1164 conditions the chips and generates an uplink signal for the uplink channel assigned to terminal 120. The uplink signal is transmitted via antenna 1152.

At base station 110, the uplink signals from terminal 120 and other terminals are received by antenna 1116, conditioned and digitized by a receiver 1120, demodulated by a demodulator 1122, and processed by an RX data and signaling processor 1124 to recover the traffic data and signaling sent by terminal 120 and other terminals.

Controllers/processors 1130 and 1170 direct the operation of various processing units at base station 110 and terminal 120, respectively. Controller/processor 1130 may perform process 500 in FIG. 5 and/or other processes. Controller/processor 1170 may perform process 500 in FIG. 5, process 700 in FIG. 7, process 900 in FIG. 9, and/or other processes. Controller/processor 1170 may receive messages and sector information from processor 1158 and may perform various functions. For example, controller/processor 1170 may determine transmission parameters (e.g., uplink channel frequency) for terminal 120, select downlink and/or uplink channels, and/or determine whether to switch downlink and/or uplink channels. Memories 1132 and 1172 store program codes and data for base station 10 and terminal 120, respectively.

Local oscillator (LO) generators 1134 and 1174 generate LO signals at the proper frequencies for frequency upconversion by transmitters 1114 and 1164, respectively. LO generators 1134 and 1174 also generate LO signals at the proper frequencies for frequency downconversion by receivers 1120 and 1154, respectively. Transmitters 1114 and 1164 and receivers 1120 and 1154 include suitable RF circuitry (e.g., duplexers, filters, and so on) to support downlink and uplink channels at different frequencies.

The transmission techniques described herein may be implemented by various means. For example, these techniques may be implemented in hardware, firmware, software, or a combination thereof. For a hardware implementation, the processing units at a terminal or a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the transmission techniques may be implemented with modules (e.g., procedures, functions, and so on) that perform the functions described herein. The firmware and/or software codes may be stored in a memory (e.g., memory 1132 or 1172 in FIG. 11) and executed by a processor (e.g., processor 1130 or 1170). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor configured to establish a connection between a terminal and a current sector serving the terminal via a first frequency channel for a first link and a second frequency channel for a second link for utilizing frequency division duplexing, to select a third frequency channel from multiple frequency channels available in the current sector for the first link based at least in part on frequency distances between the multiple frequency channels available in the current sector for the first link, wherein the first frequency channel and the third frequency channel are in the same frequency band, and to switch the connection between the terminal and the current sector to the third frequency channel for the first link while continuing to utilize frequency division duplexing and maintaining the connection between the terminal and the current sector via the second frequency channel for the second link, wherein the first, second, and third frequency channels are different from one another, and wherein the first and second frequency channels have a first frequency distance that is different than a second frequency distance between the second and third frequency channels; and
   a memory coupled to the at least one processor.

2. The apparatus of claim 1, wherein the first frequency distance is different than the second frequency distance by at least a spacing between adjacent frequency channels for the first link or the second link.

3. The apparatus of claim 1, wherein the at least one processor is configured to select a fourth frequency channel from multiple frequency channels available in the current sector for the second link based on frequency distances between the multiple frequency channels available in the current sector for the second link and to switch the connection between the terminal and the current sector to the fourth frequency channel for the second link, wherein the third and fourth frequency channels have a third frequency distance that is different than at least one of the first or second frequency distances, wherein the second frequency channel and the fourth frequency channel are in the same frequency band as the first frequency channel and the third frequency channel.

4. The apparatus of claim 1, wherein the first and second links are downlink and uplink, respectively, and wherein the first and second frequency channels are default frequency channels for the downlink and uplink, respectively.

5. The apparatus of claim 4, wherein the multiple frequency channels available in the current sector for the first link comprise a set of downlink frequency channels available for use in the current sector.

6. The apparatus of claim 1, wherein the first and second links are uplink and downlink, respectively, and wherein the first and second frequency channels are default frequency channels for the uplink and downlink, respectively.

7. The apparatus of claim 6, wherein the multiple frequency channels available in the current sector for the first link comprise a set of uplink frequency channels available for use in the current sector.

8. The apparatus of claim 1, wherein the at least one processor is further configured to select the third frequency channel based on the third frequency channel having less loading than the first frequency channel.

9. The apparatus of claim 1, wherein the at least one processor is further configured to select the third frequency channel based on the third frequency channel having less interference than the first frequency channel.

10. The apparatus of claim 1, wherein the at least one processor is further configured to select the third frequency channel based on the third frequency channel having better channel conditions than the first frequency channel.

11. The apparatus of claim 1, wherein the at least one processor is configured to establish the connection between the terminal and a base station that serves the current sector and to receive one or more of sector information associated with the multiple frequency channels available in the current sector or the selection of the third frequency channel from the base station.

12. The apparatus of claim 1, wherein the at least one processor is configured to establish the connection between the terminal and a base station that serves the current sector and to send one or more of sector information associated with the multiple frequency channels available in the current sector or the selection of the third frequency channel to the terminal.

13. A method comprising:
   establishing a connection between a terminal and a current sector serving the terminal via a first frequency channel for a first link and a second frequency channel for a second link for utilizing frequency division duplexing;
   selecting a third frequency channel from multiple frequency channels available in the current sector for the first link based at least in part on frequency distances between the multiple frequency channels available in the current sector for the first link, wherein the first frequency channel and the third frequency channel are in the same frequency band; and
   switching the connection between the terminal and the current sector to the third frequency channel for the first link while continuing to utilize frequency division duplexing and maintaining the connection between the terminal and the current sector via the second frequency channel for the second link, wherein the first, second, and third frequency channels are different from one another, and wherein the first and second frequency channels have a first frequency distance that is different than a second frequency distance between the second and third frequency channels.

14. The method of claim 13, wherein selecting the third frequency channel comprises:
    determining loading on the third frequency channel from sector information associated with the multiple frequency channels available in the current sector for the first link; and
    selecting the third frequency channel based further on the sector information indicating that the third frequency channel has less loading than the first frequency channel.

15. The method of claim 13, wherein selecting the third frequency channel comprises:
    determining interference on the third frequency channel from sector information associated with the multiple frequency channels available in the current sector for the first link; and
    selecting the third frequency channel based further on the sector information indicating that the third frequency channel has less interference than the first frequency channel.

16. An apparatus comprising:
    means for establishing a connection between a terminal and a current sector serving the terminal via a first frequency channel for a first link and a second frequency channel for a second link for utilizing frequency division duplexing;
    means for selecting a third frequency channel from multiple frequency channels available in the current sector for the first link based at least in part on frequency distances between the multiple frequency channels available in the current sector for the first link, wherein the first frequency channel and the third frequency channel are in the same frequency band; and
    means for switching the connection between the terminal and the current sector to the third frequency channel for the first link while continuing to utilize frequency division duplexing and maintaining the connection between the terminal and the current sector via the second frequency channel for the second link, wherein the first, second, and third frequency channels are different from one another, and wherein the first and second frequency channels have a first frequency distance that is different than a second frequency distance between the second and third frequency channels.

17. The apparatus of claim 16, wherein the means for selecting the third frequency channel comprises:
    means for determining loading on the third frequency channel from sector information associated with the multiple frequency channels available in the current sector for the first link; and
    means for selecting the third frequency channel based further on the sector information indicating that the third frequency channel has less loading than the first frequency channel.

18. The apparatus of claim 16, wherein the means for selecting the third frequency channel comprises:
    means for determining interference on the third frequency channel from sector information associated with the multiple frequency channels available in the current sector for the first link; and
    means for selecting the third frequency channel based further on the sector information indicating that the third frequency channel has less interference than the first frequency channel.

19. A non-transitory computer-readable medium including instructions stored thereon, comprising:
    a first instruction set for establishing a connection between a terminal and a current sector serving the terminal via a first frequency channel for a first link and a second frequency channel for a second link for utilizing frequency division duplexing;
    a second instruction set for selecting a third frequency channel from multiple frequency channels available in the current sector for the first link based at least in part on frequency distances between the multiple frequency channels available in the current sector for the first link, wherein the first frequency channel and the third frequency channel are in the same frequency band; and
    a third instruction set for switching the connection between the terminal and the current sector to the third frequency channel for the first link while continuing to utilize frequency division duplexing and maintaining the connection between the terminal and the current sector via the second frequency channel for the second link, wherein the first, second, and third frequency channels are different from one another, and wherein the first and second frequency channels have a first frequency distance that is different than a second frequency distance between the second and third frequency channels.

20. A terminal comprising:
    at least one processor configured to receive sector information sent by a base station on a downlink channel, to ascertain an uplink channel based on the sector information, and to use the uplink channel for communication with the base station, wherein the sector information indicates multiple uplink channels and multiple downlink channels available for use with the base station that sent the sector information, wherein the multiple available uplink channels and the multiple available downlink channels are in the same frequency band, and wherein the at least one processor is further configured to ascertain the uplink channel based on frequency distances between at least one of the multiple uplink channels or the multiple downlink channels available for use with the base station that sent the sector information; and
    a memory coupled to the at least one processor.

21. The terminal of claim 20, wherein the at least one processor is configured to ascertain center frequency of the uplink channel based on the frequency distances and to tune a transmitter to the center frequency of the uplink channel.

22. The terminal of claim 20, wherein the sector information indicates a specific uplink channel to use for communication, and wherein the ascertained uplink channel is the specific uplink channel indicated by the sector information.

23. The terminal of claim 20, wherein the at least one processor is configured to ascertain loading of each of multiple uplink channels based on the sector information and to select the uplink channel by considering the loading of each of the multiple uplink channels.

24. The terminal of claim 20, wherein the at least one processor is configured to select the uplink channel from among the multiple uplink channels.

25. The terminal of claim 20, wherein the sector information includes quality of service (QoS) information for multiple uplink channels available for use, and wherein the at least one processor is configured to select the uplink channel by considering the QoS information.

26. The terminal of claim 20, wherein the at least one processor is configured to send an access request on the uplink channel to the base station.

27. The terminal of claim 20, wherein the at least one processor is configured to establish a connection with the base station via the downlink channel and the uplink channel.

28. The terminal of claim 20, wherein the at least one processor is configured to ascertain at least one additional downlink channel from among the multiple downlink channels based on the frequency distances, and to acquire each of the at least one additional downlink channel.

29. The terminal of claim 28, wherein the at least one processor is configured to select one downlink channel among the downlink channel used to receive the sector information and the at least one additional downlink channel, and to use the selected downlink channel for communication with the base station.

30. The terminal of claim 20, wherein the sector information indicates center frequency of each of the multiple downlink channels, and wherein the at least one processor is configured to tune a receiver to the center frequency of each downlink channel to determine channel conditions of the downlink channel.

31. A method comprising:
receiving sector information sent by a base station on a downlink channel, wherein the sector information indicates multiple uplink channels and multiple downlink channels available for use with the base station that sent the sector information, and wherein the multiple available uplink channels and the multiple available downlink channels are in the same frequency band;
ascertaining an uplink channel based on the sector information and frequency distances between at least one of the multiple uplink channels or the multiple downlink channels available for use with the base station that sent the sector information; and
using the uplink channel for communication with the base station.

32. The method of claim 31, further comprising:
determining center frequency of the uplink channel based on the frequency distances; and
tuning a transmitter to the center frequency of the uplink channel.

33. The method of claim 31, further comprising:
determining loading of each of multiple uplink channels based on the sector information; and
selecting the uplink channel by considering the loading of each of the multiple uplink channels.

34. The method of claim 31, further comprising:
ascertaining at least one additional downlink channel from among the multiple downlink channels based on the frequency distances; and
acquiring each of the at least one additional downlink channel.

35. An apparatus comprising:
means for receiving sector information sent by a base station on a downlink channel, wherein the sector information indicates multiple uplink channels and multiple downlink channels available for use with the base station that sent the sector information, and wherein the multiple available uplink channels and the multiple available downlink channels are in the same frequency band;
means for ascertaining an uplink channel based on the sector information and frequency distances between at least one of the multiple uplink channels or the multiple downlink channels available for use with the base station that sent the sector information; and
means for using the uplink channel for communication with the base station.

36. The apparatus of claim 35, further comprising:
means for determining center frequency of the uplink channel based on the frequency distances; and
means for tuning a transmitter to the center frequency of the uplink channel.

37. The apparatus of claim 35, further comprising:
means for determining loading of each of multiple uplink channels based on the sector information; and
means for selecting the uplink channel by considering the loading of each of the multiple uplink channels.

38. The apparatus of claim 35, further comprising:
means for ascertaining at least one additional downlink channel from among the multiple downlink channels based on the frequency distances; and
means for acquiring each of the at least one additional downlink channel.

39. A non-transitory computer-readable medium including instructions stored thereon, comprising:
a first instruction set for receiving sector information sent by a base station on a downlink channel, wherein the sector information indicates multiple uplink channels and multiple downlink channels available for use with the base station that sent the sector information, and wherein the multiple available uplink channels and the multiple available downlink channels are in the same frequency band;
a second instruction set for ascertaining an uplink channel based on the sector information and frequency distances between at least one of the multiple uplink channels or the multiple downlink channels available for use with the base station that sent the sector information; and
a third instruction set for directing use of the uplink channel for communication with the base station.

40. A terminal comprising:
at least one processor configured to select a first frequency channel from among at least one frequency channel assigned to a sector for a first link, to select a second frequency channel from among multiple frequency channels assigned to the sector for a second link, and to establish a connection via the first frequency channel for the first link and the second frequency channel for the second link, wherein the multiple frequency channels assigned to the sector for the second link are in the same frequency band and comprise one frequency channel designated in the sector as a primary frequency channel for the second link and at least one frequency channel designated in the sector as an auxiliary frequency channel for the second link, wherein the first link and the second link comprise an uplink and a downlink, wherein the first frequency channel is different than the second frequency channel, and wherein the selection of the first frequency channel is independent of the selection of the second frequency channel; and
a memory coupled to the at least one processor.

41. The terminal of claim 40, wherein the frequency band that includes the multiple frequency channels for the second link further includes the at least one frequency channel for the first link.

42. The terminal of claim 40, wherein the multiple frequency channels comprise the second frequency channel and a third frequency channel, and wherein a frequency distance between the first and second frequency channels and a frequency distance between the first and third frequency channels are different by at least a spacing between adjacent frequency channels for the second link.

43. The terminal of claim 40, wherein the at least one processor is configured to obtain measurements for the at least one frequency channel for the first link and to select the first frequency channel based on the measurements.

44. The terminal of claim 40, wherein the at least one processor is configured to receive sector information from one of the at least one frequency channel for the first link and to select the first frequency channel based on the sector information.

45. The terminal of claim 40, wherein the at least one processor is configured to receive sector information from one of the at least one frequency channel for the first link and to select the second frequency channel based on the sector information.

46. A method comprising:
selecting a first frequency channel from among at least one frequency channel assigned to a sector for a first link;
selecting a second frequency channel from among multiple frequency channels assigned to the sector for a second link, wherein the multiple frequency channels assigned to the sector for the second link are in the same frequency band and comprise one frequency channel designated in the sector as a primary frequency channel for the second link and at least one frequency channel designated in the sector as an auxiliary frequency channel for the second link, wherein the first link and the second link comprise an uplink and a downlink, wherein the first frequency channel is different than the second frequency channel, and wherein the selection of the first frequency channel is independent of the selection of the second frequency channel; and
establishing a connection via the first frequency channel for the first link and the second frequency channel for the second link.

47. The method of claim 46, wherein the selecting the first frequency channel comprises
obtaining measurements for the at least one frequency channel for the first link, and
selecting the first frequency channel based on the measurements.

48. The method of claim 46, wherein the selecting the second frequency channel comprises
receiving sector information from one of the at least one frequency channel for the first link, and
selecting the second frequency channel based on the sector information.

49. An apparatus comprising:
means for selecting a first frequency channel from among at least one frequency channel assigned to a sector for a first link;
means for selecting a second frequency channel from among multiple frequency channels assigned to the sector for a second link, wherein the multiple frequency channels assigned to the sector for the second link are in the same frequency band and comprise one frequency channel designated in the sector as a primary frequency channel for the second link and at least one frequency channel designated in the sector as an auxiliary frequency channel for the second link, wherein the first link and the second link comprise an uplink and a downlink, wherein the first frequency channel is different than the second frequency channel, and wherein the selection of the first frequency channel is independent of the selection of the second frequency channel; and
means for establishing a connection via the first frequency channel for the first link and the second frequency channel for the second link.

50. The apparatus of claim 49, wherein the means for selecting the first frequency channel comprises
means for obtaining measurements for the at least one frequency channel for the first link, and
means for selecting the first frequency channel based on the measurements.

51. The apparatus of claim 49, wherein the means for selecting the second frequency channel comprises
means for receiving sector information from one of the at least one frequency channel for the first link, and
means for selecting the second frequency channel based on the sector information.

52. An apparatus comprising:
at least one processor configured to determine loading on each of multiple uplink channels that are in the same frequency band and available for use with the apparatus, to send on a downlink channel sector information that indicates the multiple uplink channels available for use with the apparatus and information for the loading on the multiple uplink channels available for use with the apparatus, and to communicate with at least one terminal on an uplink channel selected from the multiple uplink channels available for use with the apparatus based on the loading on the multiple uplink channels and further based on frequency distances between the multiple uplink channels; and
a memory coupled to the at least one processor.

53. The apparatus of claim 52, wherein the at least one processor is configured to send center frequency of at least one of the multiple uplink channels.

54. The apparatus of claim 52, wherein the at least one processor is configured to send quality of service (QoS) information for the multiple uplink channels.

55. The apparatus of claim 52, wherein the at least one processor is further configured to determine loading on each of multiple downlink channels that are available for use with the apparatus and in the same frequency band as the multiple available uplink channels, and to send on the downlink channel information that indicates the multiple downlink channels available for use with the apparatus and information for the loading on the multiple downlink channels available for use with the apparatus.

56. The apparatus of claim 52, wherein the at least one processor is further configured to send on the downlink channel information that indicates downlink channels available for use with the apparatus.

57. The apparatus of claim 52, wherein the at least one processor is configured to send power backoffs for multiple downlink channels.

58. The apparatus of claim 52, wherein the at least one processor is configured to send frequency distances between multiple downlink channels and the downlink channel.

59. A method comprising:
determining loading on each of multiple uplink channels available for use with a base station, wherein the multiple available uplink channels are in the same frequency band;
sending on a downlink channel sector information that indicates the multiple uplink channels available for use with the base station and information for the loading on the multiple uplink channels available for use with the base station; and
communicating with at least one terminal on an uplink channel selected from the multiple uplink channels available for use with the base station based on the loading on the multiple uplink channels and further based on frequency distances between the multiple uplink channels.

60. The method of claim 59, further comprising:
sending center frequency of at least one of the multiple uplink channels and quality of service (QoS) information for the multiple uplink channels.

61. The method of claim 59, further comprising:
determining loading on each of multiple downlink channels that are available for use with the base station and in the same frequency band as the multiple available uplink channels; and
sending on the downlink channel information that indicates the multiple downlink channels available for use with the base station, information for the loading on the multiple downlink channels available for use with the base station, power backoffs for the multiple downlink channels available for use with the base station, and frequency distances between the multiple downlink channels available for use with the base station and the downlink channel.

62. The method of claim 59, further comprising:
sending on the downlink channel information that indicates downlink channels available for use with the base station.

63. An apparatus comprising:
means for determining loading on each of multiple uplink channels available for use with the apparatus, wherein the multiple available uplink channels are in the same frequency band;
means for sending on a downlink channel sector information that indicates the multiple uplink channels available for use with the apparatus and information for the loading on the multiple uplink channels available for use with the apparatus; and
means for communicating with at least one terminal on an uplink channel selected from the multiple uplink channels available for use with the apparatus based on the loading on the multiple uplink channels and further based on frequency distances between the multiple uplink channels.

64. The apparatus of claim 63, further comprising:
means for sending center frequency of at least one of the multiple uplink channels and quality of service (QoS) information for the multiple uplink channels.

65. The apparatus of claim 63, further comprising:
means for determining loading on each of multiple downlink channels that are available for use with the apparatus and in the same frequency band as the multiple available uplink channels; and
means for sending on the downlink channel information that indicates the multiple downlink channels available for use with the apparatus, information for the loading on the multiple downlink channels available for use with the apparatus, power backoffs for the multiple downlink channels available for use with the apparatus, and frequency distances between the multiple downlink channels available for use with the apparatus and the downlink channel.

66. The apparatus of claim 63, further comprising:
means for sending on the downlink channel information that indicates downlink channels available for use with the apparatus.

67. A non-transitory computer-readable medium including instructions stored thereon, comprising:
a first instruction set for determining loading on each of multiple uplink channels available for use with a base station, wherein the multiple available uplink channels are in the same frequency band;
a second instruction set for sending on a downlink channel sector information that indicates the multiple uplink channels available for use with the base station and information for the loading on the multiple uplink channels available for use with the base station; and
a third instruction set for communicating with at least one terminal on an uplink channel selected from the multiple uplink channels available for use with the base station based on the loading on the multiple uplink channels and further based on frequency distances between the multiple uplink channels.

68. A non-transitory computer-readable medium including instructions stored thereon, comprising:
a first instruction set for selecting a first frequency channel from among at least one frequency channel assigned to a sector for a first link;
a second instruction set for selecting a second frequency channel from among multiple frequency channels assigned to the sector for a second link, wherein the multiple frequency channels assigned to the sector for the second link are in the same frequency band and comprise one frequency channel designated in the sector as a primary frequency channel for the second link and at least one frequency channel designated in the sector as an auxiliary frequency channel for the second link, wherein the first link and the second link comprise an uplink and a downlink, wherein the first frequency channel is different than the second frequency channel, and wherein the selection of the first frequency channel is independent of the selection of the second frequency channel; and
a third instruction set for establishing a connection via the first frequency channel for the first link and the second frequency channel for the second link.

* * * * *